May 7, 1935.　　　W. TAYLOR　　　2,000,623
APPARATUS FOR MOLDING CERAMIC STRUCTURES
Filed July 20, 1931　　　3 Sheets-Sheet 1
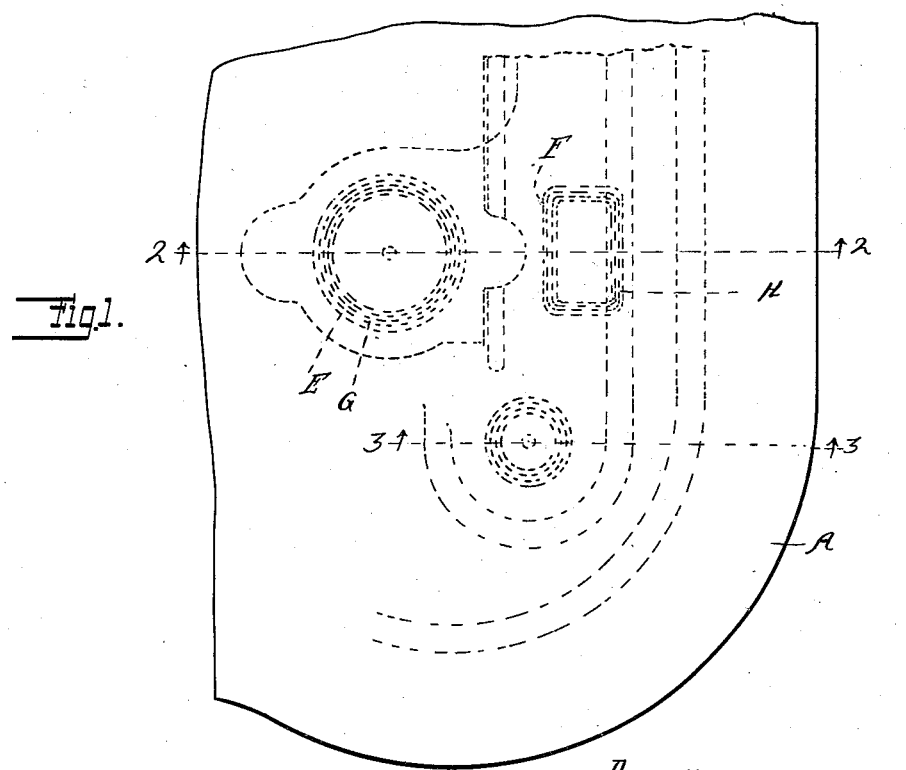
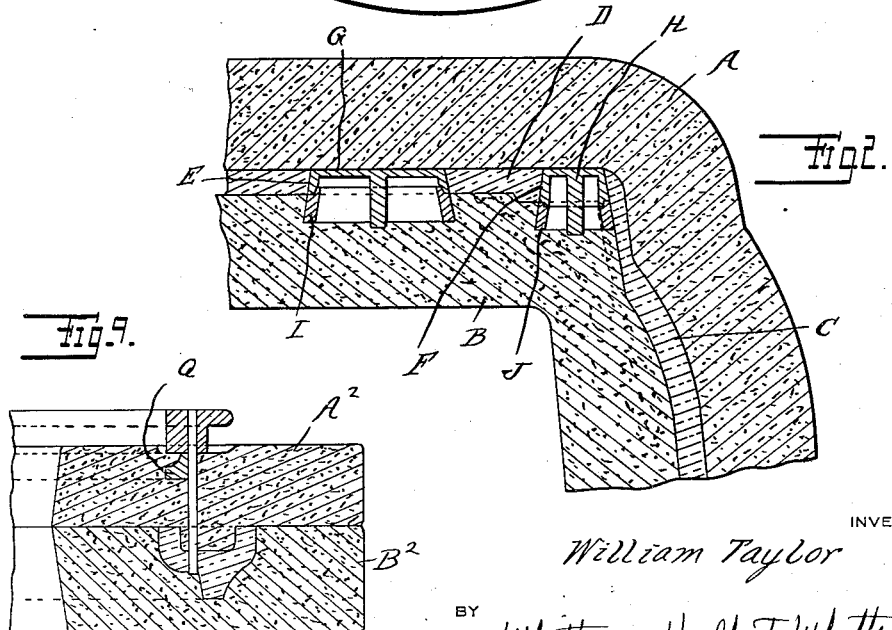
INVENTOR
William Taylor
BY Whittemore Hulbert Whittemore
& Belknap
ATTORNEYS

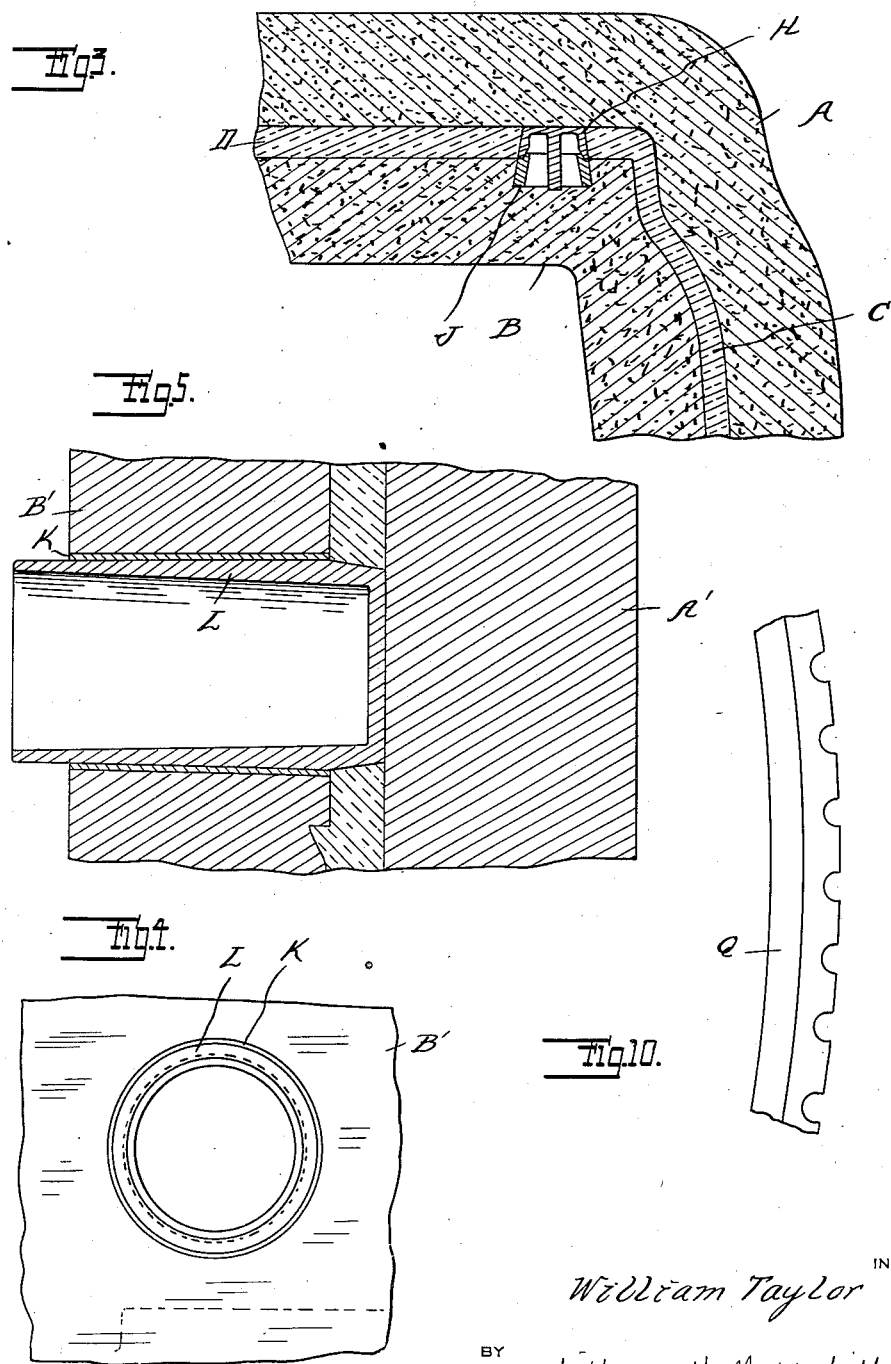

May 7, 1935. W. TAYLOR 2,000,623
APPARATUS FOR MOLDING CERAMIC STRUCTURES
Filed July 20, 1931 3 Sheets-Sheet 3
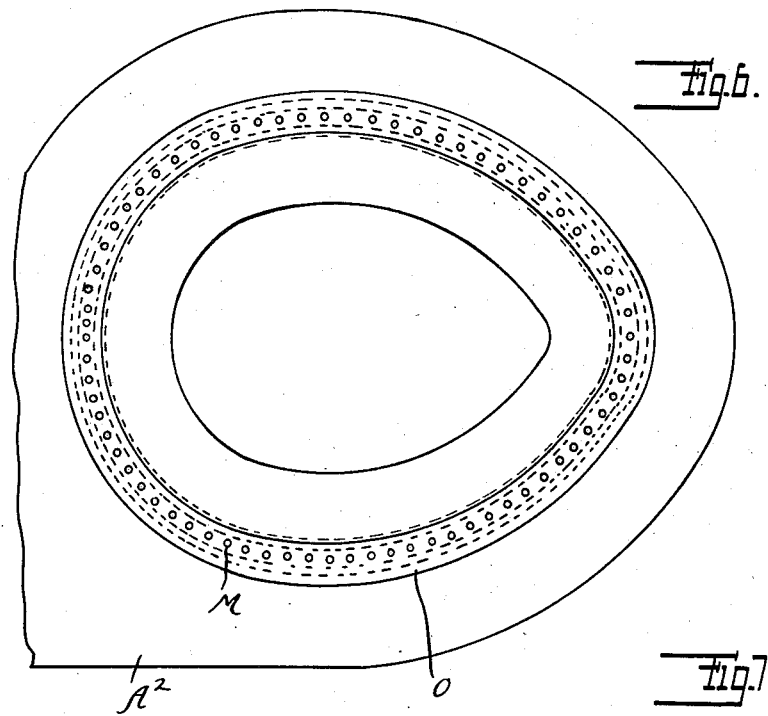
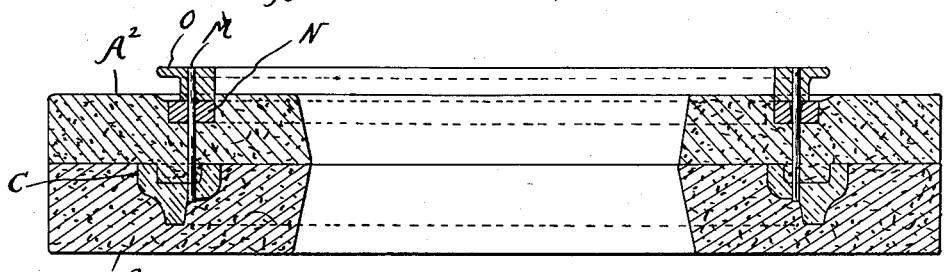
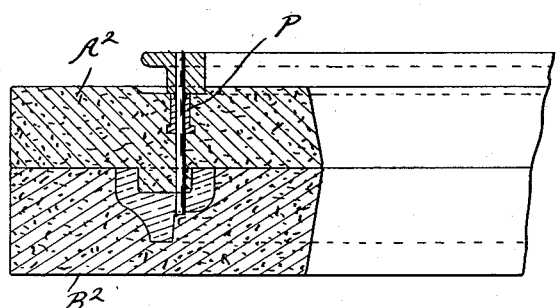
INVENTOR
William Taylor
BY
ATTORNEYS Patented May 7, 1935

2,000,623

UNITED STATES PATENT OFFICE 2,000,623

APPARATUS FOR MOLDING CERAMIC STRUCTURES

William Taylor, Toronto, Ontario, Canada, assignor to James M. Teahan, Detroit, Mich.

Application July 20, 1931, Serial No. 551,987

4 Claims. (Cl. 25—129)

The invention relates to the method of molding ceramic structures and more particularly to the forming of structures that must be provided with accurately located apertures therein. As an example, in the manufacture of water closets and similar complex structures it is customary to separately mold portions of the structures in porous molds and then to assemble these portions to form the final integral structure. To permit of such assembly the separate elements must be of accurate form not only externally, but also where provided with apertures for engaging other parts, these must be accurately located. Thus the flushing tank where integral with the bowl must have an accurately located discharge outlet in its bottom for receiving the seat for the flush valve. Also the bottom is apertured for connection with the overflow conduit while the rim of the bowl must be apertured to form a rim flush. In the same manner in molding the parts of other ceramic structures it is necessary to form apertures therein.

In the present state of the art the usual method of forming such structures is to first mold the elements with continuous walls and subsequently to punch out portions to form the required apertures in particular locations. Another method which has been proposed is to provide the molds not only with porous walls but also with porous cores for forming the desired apertures. This is unsatisfactory as it is very difficult to disengage the molded clay from the mold and cores without breaking. Furthermore, cores made of porous material are very fragile and are easily broken or injured.

It is the object of the present invention to avoid the difficulties as above referred to, and to this end I have devised an improved method and apparatus as hereinafter set forth.

In the drawings:

Figure 1 is a plan view of a mold for forming the tank portion of a water closet;

Figures 2 and 3 are cross sections respectively on lines 2—2 and 3—3 of Figure 1;

Figure 4 is a plan view and

Figure 5 a cross section of a modified construction;

Figure 6 is a plan view of a portion of a mold for forming the flushing rim for the water closet;

Figure 7 is a cross section therethrough;

Figures 8 and 9 are similar cross sections showing modified constructions;

Figure 10 is a plan view of the guide and reinforcement member shown in Figure 9.

In the method extensively used for molding clay structures the molds are formed of plaster or other porous material and are then filled with fluid clay having sufficient water to permit of pouring. In the porous mold the water is extracted, leaving the solid clay to fill the mold cavity. With my improved process and apparatus I follow this general procedure but instead of forming the apertures in the clay body subsequent to the molding, these are formed by suitably located cores. Also, instead of forming the cores of porous material they are formed from non-absorbent material such as metal which can be made more accurate in form and more accurately located. The non-absorbent cores have the further advantage that they can be easily removed without danger of breaking the adjacent clay, and this is due to the fact that the moisture in the clay is drawn away from the cores and therefore has no tendency to shrink the clay upon the core or to cause adhesion thereto.

As shown in Figures 1 to 3, A and B are the porous mold sections for forming a tank C having a flat bottom portion D. This bottom must be provided with an aperture E for receiving the seat for the flush valve and an aperture F for registering with an overflow conduit extending within the tank to above the normal water level. To form the apertures E and F I have provided metallic core members G and H, the peripheral edges of which are slightly tapered for draft to permit of easy removal. To accurately locate these core members I have permanently imbedded in one of the mold sections such as B, metallic sheet members I and J. These are fashioned to engage with the abutting portions of the cores E and F and to hold the latter accurately in position. Thus after the fluid clay has been poured to fill the mold cavity and the moisture has been absorbed by the porous molds, the mold section B is removed from the mold section A, carrying with it the seat members I and J but leaving the cores E and F still in engagement with the clay. These cores may then be disengaged from the clay before removing the latter from the mold section A.

With the modified construction shown in Figure 4, the mold section B' has permanently imbedded therein the guide sleeve K through which the core member L may be inserted to project into the mold cavity. With this construction after the molding of the clay the core section L is first withdrawn and subsequently the mold sections A' B' are separated from each other and from the clay body.

With the construction shown in Figures 6 and 7

A², B² are the porous mold sections for forming a portion of a rim C for a water closet bowl. This rim is used for flushing the wall of the bowl and to this end must be provided with a series of jet apertures. These are formed by pins M which are inserted through apertures in the mold section A² and are guided by a metallic guide and reinforcing member N which is imbedded in said section. The pins are all attached to a common ring O by means of which after the clay has filled the mold cavity all of said pins may be simultaneously withdrawn prior to the separation of the mold sections A² B² from each other. In the modification shown in Figure 8 instead of a single member N forming the guide for all of the pins, the individual pins are guided by bushing members P which surround the same and are imbedded in the member A². Figures 9 and 10 show another modification in which a ring Q forms a guide and reinforcing member imbedded in the mold section A², but this ring instead of being bored for the passage of the pins has its peripheral edge grooved to guide the pins, as shown in Figure 10.

With all of the constructions described the method of forming the aperture in the clay body is the same in that the liquid clay flows to surround an impervious core member within the mold cavity and the moisture in the clay is absorbed by flowing in a direction away from this core member, thereby preventing adhesion of the same to the clay and facilitating its removal.

What I claim as my invention is:

1. An apparatus for molding clay comprising porous mold sections cooperating to define a predetermined mold cavity corresponding to the external surface of the article to be molded, a core formed of non-porous non-absorbent material located within said mold cavity and a guide for positioning said core imbedded in one of said mold sections.

2. An apparatus for molding clay comprising cooperating mold sections of porous material together forming a mold cavity of the desired form, a core of non-porous non-absorbent material located within said mold cavity and a guide for positioning said core imbedded in one of said mold sections, said core being separable from said guide independent of the separation of the same from said mold cavity.

3. An apparatus for molding clay, cooperating porous mold sections fashioned to form a mold cavity of predetermined shape, a guide member imbedded in one of said mold sections and a core member separably engaging said guide located within the mold cavity, said core being formed of a non-absorbent material.

4. An apparatus for molding clay comprising cooperating mold sections of porous material together forming a mold cavity, a guide and reinforcement member imbedded in one of said mold sections and a series of core pins slidably engaging said guide and insertable therethrough into the mold cavity, said pins being formed of non-absorbent material.

WILLIAM TAYLOR.